United States Patent
Krakauer et al.

[15] 3,701,433
[45] Oct. 31, 1972

[54] FILTER FOR USE IN THE FILTRATION OF BLOOD

[72] Inventors: Sidney Krakauer; David Rosenberg, both of Glen Cove, N.Y.

[73] Assignee: Pall Corporation, Glen Cove, N.Y.

[22] Filed: Nov. 10, 1970

[21] Appl. No.: 88,356

[52] U.S. Cl..............210/436, 128/214 C, 210/446, 210/457, 210/499
[51] Int. Cl........................B01d 27/06, B01d 39/08
[58] Field of Search...128/214 C; 210/436, 446, 499, 210/500, 507, 457

[56] References Cited
UNITED STATES PATENTS

| | | |
|---|---|---|
| 2,473,153 | 6/1949 | Lager..................128/214 C X |
| 2,571,059 | 10/1951 | Puschelberg et al...210/507 X |
| 3,448,041 | 6/1969 | Swank....................210/446 X |
| 2,914,181 | 11/1959 | Naftulin et al............210/446 |
| 3,557,786 | 1/1971 | Barr, Sr..................128/214 C |
| 2,644,586 | 7/1953 | Cutter................128/214 C X |

*Primary Examiner*—Reuben Friedman
*Assistant Examiner*—R. W. Burks
*Attorney*—Janes & Chapman

[57] ABSTRACT

A filter element is provided for use in the filtration of blood such as in cardiopulmonary bypass techniques in open heart surgery, comprising a woven square weave mesh of polyester monofilaments having a pore size within the range from about 25 to about 50 microns.

18 Claims, 7 Drawing Figures

PATENTED OCT 31 1972

FILTER FOR USE IN THE FILTRATION OF BLOOD

A serious problem in the use of cardiopulmonary bypass techniques, although much improved in recent years, is the significant risk of brain injury. *Medical World News*, July 17, 1970, page 29, reported that several studies of open heart surgery patients have called attention to the neurologic complications that afflict many of them during the post operative period, impaired consciousness and deranged behavior being the most common. No one has been able to explain the cause of this.

Patterson and Kessler, *The Annals of Thoracic Surgery*, Vol. 9, No. 3, March 1970, pages 221 to 228, *Surgery, Gynecology & Obstetrics*, Sept. 1969, Vol. 129, pages 505 to 510, reported the results of a number of experiments studying the effect of oxygenators on the blood during cardiopulmonary bypass. Patterson and Kessler pointed out that although cardiopulmonary bypass has proved a remarkable therapeutic tool, the most commonly used oxygenators in some way altered blood, which eventually results in damage to the perfused tissue. The identity of the toxic material was not clear, but there was evidence that particulate matter was responsible, principally microemboli of silicone, gas, aggregated blood elements, and denatured lipoprotein. Utilizing ultrasound techniques in a specially designed detection chamber, Patterson and Kessler showed that blood oxygenators produced microemboli in large quantities, and moreover, they noted that the proportion in which the oxygen and the blood were mixed bore an impressive relationship to the formation of microemboli. The filters used in this work did not successfully remove large numbers of microemboli from the blood, however, as compared with a canine lung which was used as a filter.

This work led Patterson Brennan and Kessler to correlate the microemboli with the significant depression in brain metabolism found after cardiopulmonary bypass. In experiments carried out on laboratory dogs, on partial cardiopulmonary bypass, with baseline studies of cerebral blood flow and cerebral metabolic rates for oxygen, glucose, $CO_2$ and lactate, they determined that particle (microemboli) counts when the animals were undergoing cardiopulmonary bypass averaged 8000 per minute. Average values for cerebral blood flow fell 25 percent, cerebral metabolic rates for oxygen fell 45 percent, $CO_2$ production by brain dropped 50 percent, and glucose metabolism fell 6 percent, and these changes were not immediately reversible. Then, these workers placed a filter in the arterial line, after which particle counts averaged only 240 per minute, and there was no fall in cerebral blood flow; in fact, there was a slight increase. A similar increase was noted in the flow in control animals connected to the pump oxygenator only momentarily, and then disconnected immediately. Moreover, with the filter in the circuit, cerebral metabolic rates for oxygen and glucose fell by only 9 percent and 16 percent, respectively, and returned to normal 1 ½ hours later.

The filter employed in these studies was a disk of stainless steel mesh, 6 inches in diameter, with a uniform pore size of 25 microns. However, this filter although suitable for dogs could not pass blood at the flow rates required for adult humans without severe hemolysis, because of its relatively low surface area, as Patterson and Twichell have reported in an as yet unpublished report. For adult humans, high rates of blood flow are necessary if trauma is to be avoided. Moreover, a stainless steel filter is not practical for human blood use, since it is too costly to be disposable after use, and is too difficult and time consuming to clean to be reusable.

In accordance with the invention, a filter element is provided that is capable of passing human blood at a sufficiently high flow rate to be useful in cardiopulmonary bypass and massive blood transfusion, and which at the same time, since it is made of an inexpensive plastic material, is disposable, and can be discarded after use. The plastic material employed is inert to blood, and the pore size of the filter element is fixed, so that it does not change in use or with temperature, in part because of the nature of the plastic filamentary material, and in part because of the manner in which the filaments are fixed against relative displacement in the element.

The filter element in accordance with the invention comprises a woven square weave plastic mesh sheet of polyester monofilaments having a pore size within the range from about 25 to about 50 microns. The filaments are locked in place at their crossing points. The diameter of the monofilaments is important in determining both pore size and percent open area, the latter being important in maintaining a high blood flow rate through the filter. The monofilaments have a diameter within the range from about 25 to about 50 microns.

As used herein, "filter sheet" refers to the filtering sheet in a filter element. The term "filter element" refers to a filter sheet arranged in a structure that ensures fluid flow through the filter sheet when the element is placed in a housing across the line of flow from the inlet to the outlet. The term "filter unit" refers to the filter element plus a housing equipped at least with an inlet and an outlet.

Most polyester monofilaments available today are polyesters of ethylene glycol and terephthalic acid, which are available under the trademark Dacron. Polyester monofilaments can also be made of other polymers of alkylene glycols and dicarboxylic acids, usually, aromatic acids, but also cycloaliphatic and aliphatic acids, of which propylene glycol-1,2, butylene glycol-2,3 and 1,2, and pentylene glycol-1,2,-2,3, and 1,3, esterified with terephthalic acid or alkyl-substituted terephthalic acids, or adipic, or suberic acids, or cyclo-hexane-1,4 dicarboxylic acid, are exemplary. The ethylene glycol-terephthalic acid polyester monofilaments are preferred, because of their availability and low cost. However, polyesters of other glycols and acids can be used.

Exemplary polyester monofilament screen cloths which can be employed as filter elements in accordance with the invention are made from polyester monofilament 40 microns in diameter with a mesh opening of 53 microns and 33 percent open area, a mesh opening of 44 microns with 27 percent open area, and a mesh opening of 37 microns with 23 percent open area.

The monofilaments are locked in position at their points of crossing. The locking not only increases strength and regidity but it also fixes the pores against change in dimensions in use, which is estremely important. If the pores are too small, below about 25 μ, they remove valuable blood components such as blood cells, which is of course undesirable. On the other hand, if they are too large, they permit microemboli to pass, which it is the purpose of the filter to prevent.

Such filter sheets can be fitted into disposable filter elements of any design and configuration. For maximum open area and high flow rate in a confined space, the filter sheet is preferably corrugated or convoluted, to provide a high surface area to flow. A suitable configuration of filter element has the filter sheet folded into a corrugated cylinder, the open ends of which are closed off by end caps, limiting access to the filtrate flow line to flow through the filter, the filtrate flow line being in operative connection to at least one of the end caps.

The end caps are also preferably of plastic material, and can be of polyester resin. The end caps can be bonded to the filter sheet, using a potting compound or an adhesive of conventional type. However, to ensure a bacteria-tight seal, it is preferred to fuse the end caps to the filter sheet, and for this purpose, a polyolefin such as polyethylene or polypropylene is preferred. Other plastic materials that can be used as the end caps include polyamides, polyvinyl chloride, polyvinylidene chloride, polycarbonates, as well as Teflon, polytetrafluoroethylene and Kel-F, polytrifluorochloroethylene, but these are more difficult to bond.

To assist the filter sheet in retaining its shape, particularly a corrugated shape, it is preferable to provide a porous support externally of the filter sheet, and preferably in close juxtaposition to or in contact with the filter sheet on both the upstream side and the downstream side. The support material is stiffer than the filter sheet, and is preferably flexible, and also preferably plastic, so that it may be bonded to the same end cap in the filter element. A preferred supporting material is Vexar mesh (extruded polypropylene netting). Any perforated sheet having an uneven surface, such as dimpled, ridged, or quilted, can be used. Exemplary are polypropylene sheet, polyethylene sheet, polyvinylidene chloride sheet, polyvinyl chloride sheet, and other plastic materials of the type conventionally used for end caps can be employed, with such an uneven surface, so as to provide drainage and prevent blocking of the filter sheet by the support sheet.

Preferred embodiments of the invention are illustrated in the drawings, in which.

Figure 1:
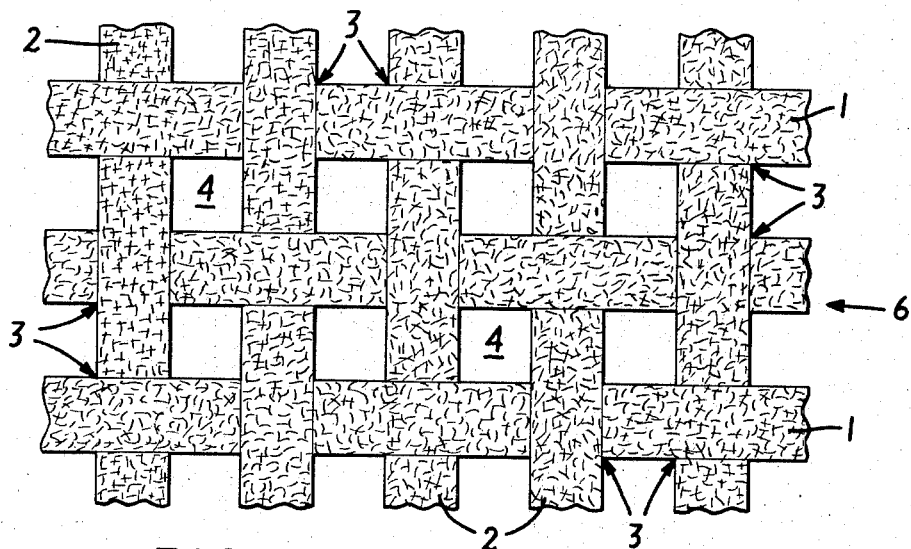
FIG. 1 represents an enlarged top view of a polyester monofilament mesh filter sheet in accordance with the invention.

The filter shown in FIG. 1 is a sinter-bonded polyester monofilament square weave mesh, having a pore opening of 40 μ, a monofilament diameter of 40 μ, and 27 percent open area. The weft monofilaments 1 are bonded to the warp monofilaments 2 at their points of crossing 3, defining fixed 40 μ pores 4, at their interstices.

Figure 4:
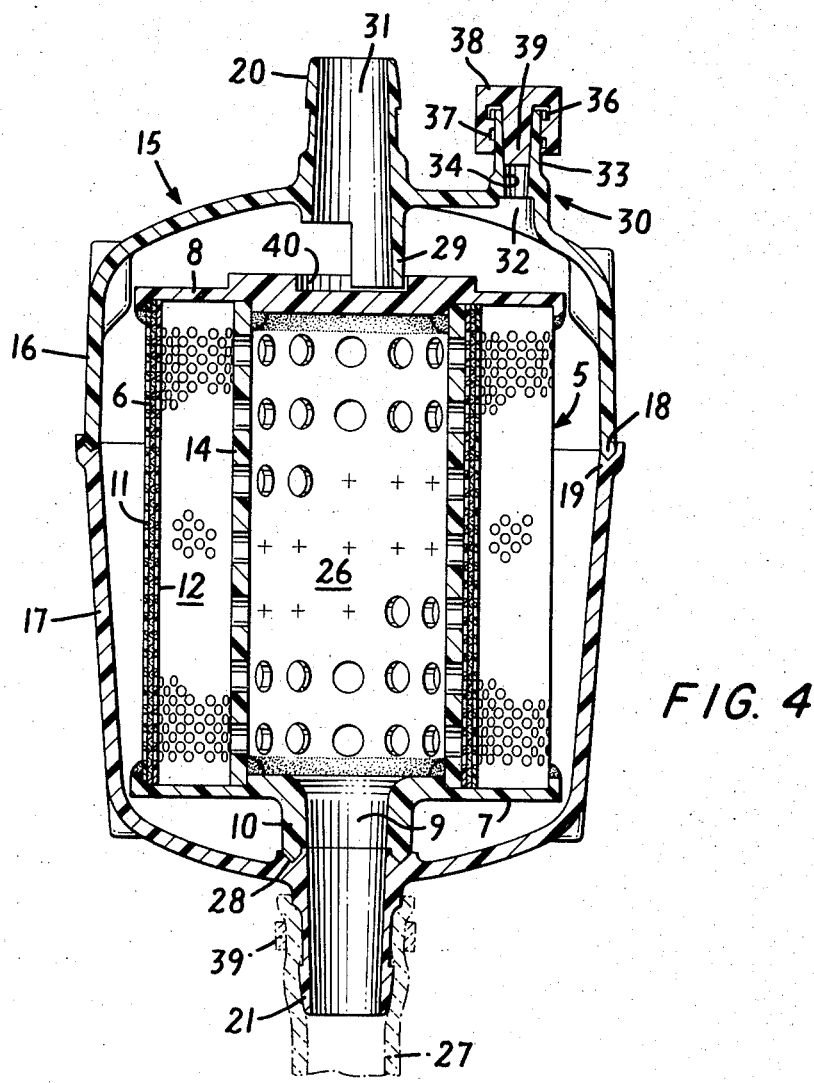
FIG. 4 represents a cross-sectional view taken along the lines 4—4 of FIG. 3, and looking in the direction of the arrows.
Figure 2:
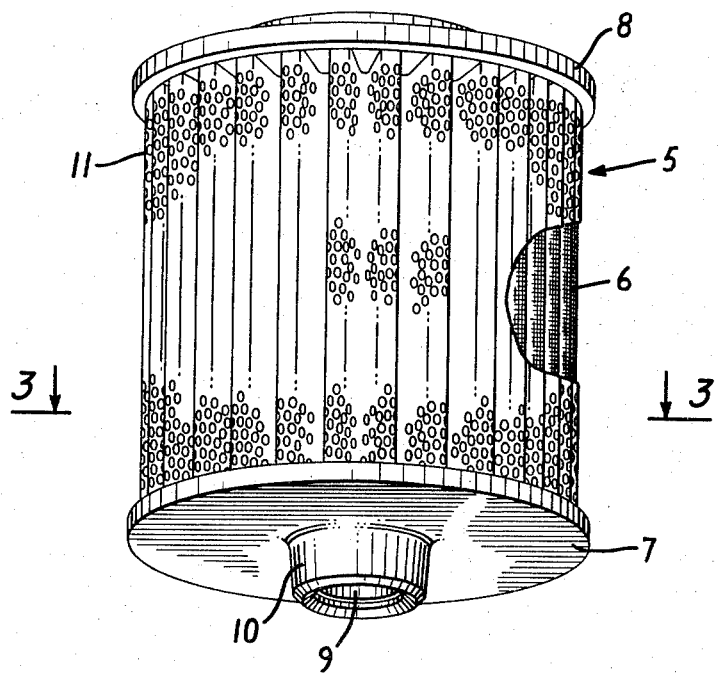
FIG. 2 represents an isometric view of a filter element embodying the filter sheet of FIG. 1.
Figure 3:
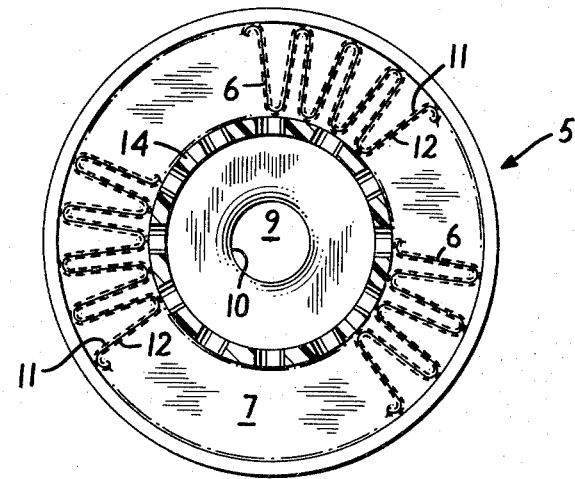
FIG. 3 represents a longitudinal section through a filter unit embodying a filter element of FIG. 2.

The filter element 5 shown in FIGS. 2 to 4 has such a filter sheet 6 in corrugated form, folded into a cylinder whose open ends are closed off by end caps 7,8 of polypropylene. The end cap 7 has a central aperture 9, and an integral projecting annular connection 10 leading directly to an outlet of a filter unit housing. Externally and internally of the filter sheet corrugated protective supporting sheets 11,12 of Vexar polypropylene netting, 50 mesh, and concentric to this corrugated three-sheet composite is a rigid perforated polypropylene core 14. The end caps are fused to the filter sheet 6 and the Vexar sheets 11, 12.

The filter unit shown in FIGS. 3 and 4 comprises a filter housing 15 made in two portions 16, 17, bonded together by fusing at their mating portions 18, 19. Each housing portion 16, 17 has a line connection 20, 21 integral therewith, to accomplish an in-line connection in a blood circulation system, such as in a cardiopulmonary bypass blood circulation system, or in a transfusion system. The line connections shown are for three-eighths inch internal diameter tubing 27. The housing portions are made of plastic, such as polypropylene. The line connection 20 in the embodiment shown serves as an inlet, and the line connection 21 as an outlet, but fluid flow can also be in the opposite direction, if desired, without making any change in the structure shown.

The filter element 5 is attached at the end cap 7-end to the housing wall at joint 28 via annular connection 10, which fits snugly into the joint, and is bonded thereto. There is thus a direct connection that is leak-tight and bacteria-tight, between the interior 26 of the filter element 5 and the line 27 attached to the line connection 21 via a clamp 39.

The line connection 20 has an inwardly extending curved barrier 29 that continues to and abuts a recess 40 in end cap 8, and extends over a segment of a circle at the portion of the housing 16 adjacent the vent 30, and serves to direct flow from the inlet passage 31 away from the vent. This aids in venting gas such as air from the filter unit when it is first put onstream, without interference from incoming fluid flow.

The vent 30 is formed at a recess 32 in the housing portion 16 in an outwardly extending nipple 33 with a through tapered bore 34. The end tip of the nipple 33 has four outwardly-extending lugs or projections 36, which are arranged to engage the internal double threads 37 of the removable cap 38. The cap has a tapered plug 39 which seats in bore 34, the tapers of plug 37 and bore 34 being the same, and seals off the vent thereby in a leak-tight and bacteria-tight seal.

It will be apparent that this is a simple filter unit, easily fabricated from plastic by extrusion or compression molding or by casting in two housing parts, one cap, and one filter element, and that all parts are permanently bonded together. The unit is thus susceptible to mass production at low cost to easily reproduced standard specifications, and can be discarded after use. Its small capacity, less than 500 cc, and preferably less than 250 cc, suits it especially for any type of blood circulation system.

If desired, the line connections 20,21 can be fitted with Luer locks, to facilitate connection to standard fittings of other types of medical equipment. The vent nipple 33 as shown has a Luer lock fitting, for a standard Luer lock cap.

Figure 5:
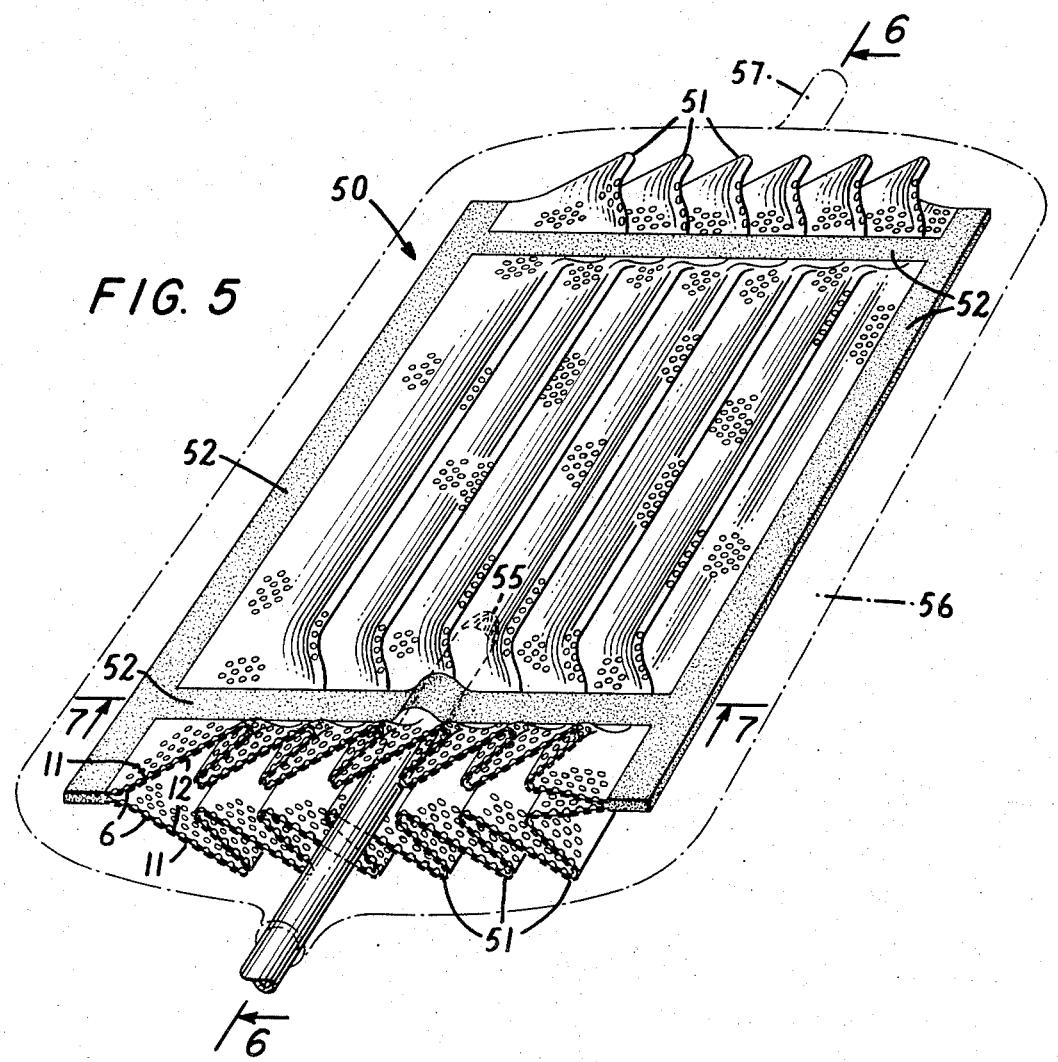
FIG. 5 represents an isometric view of another embodiment of filter element in accordance with the invention.
Figure 6:
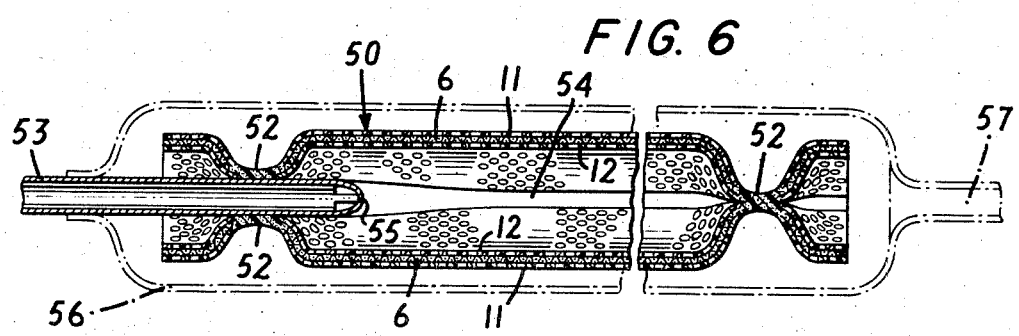
FIG. 6 represents a longitudinal section of the filter element of FIG. 5, taken along the lines 6—6 and looking in the direction of the arrows.
Figure 7:
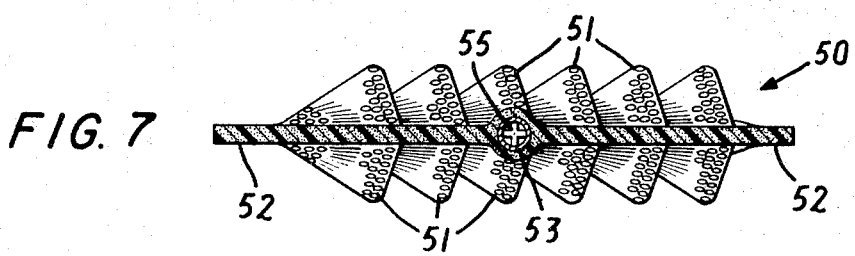
FIG. 7 represents a cross section of the filter element of FIG. 5, taken along the lines 7—7, and looking in the direction of the arrows.

The filter element 50 of FIGS. 5 to 7 has a three-layer composite filter sheet 6 and support sheets 11, 12, in corrugated shingled form, with the corrugated folds 51 lying in the plane of the filter element in overlapping fashion. The composite is heat-sealed at 52 along its four sides, (or along three sides, if folded on itself). The element has a line connection via the tube 53 extending into the open interior 54 of the element and terminating in a caged tip 55. The only access to and from the tube is via the filter sheet 6. The tube 53 can serve as an outlet tube for filtrate flow, in normal use, but it can also serve as an inlet in which case flow through the filter sheet 6 is in the opposite direction. This type of filter element is especially useful in a flexible bag-type of filter unit, in which the tube 53 can extend to outside the bag 56 (shown in dashed lines in FIG. 5), and can be heat-sealed to the bag in the same manner as to the filter element. The other end of the bag has an inlet (or outlet) tube 57, for access to the other side of the filter element.

This type of filter element is especially useful for blood filtration in which case it can be built into a standard blood bag, but it can also have other uses, and any type of filter sheet can be used, as well as any type of housing.

The corrugated configuration of the filter sheet in this element provides high surface area, and the shingled arrangement of the corrugations make it possible to provide a flat pouch without the need for a core support, because the spaces between the shingles act as conduits, while at the same time, the singled overlapping structure provides structural support. The outer support layers of the three-layer composite are of heat-softenable material, while the filter sheet is not affected under the conditions at which the outer layers soften, so that the latter can be fused together in a leak-tight heat seal through the filter sheet pores without deleriously affecting the filter sheet. The heat seal is easily effected by high frequency heating, and all heat seals can be formed simultaneously, including the heat seals with the tube.

Remarkable results have been obtained using filter elements in accordance with the invention, in a filter unit of a structure similar to that shown in FIGS. 3 to 4 in cardiopulmonary bypass. The following examples illustrate such use, using a filter unit 6×9 cm. in outside dimensions, in a filter unit whose fluid volume was 240 cc., made entirely of polypropylene except for the polyester monofilament square weave mesh filter element. The total surface area of the filter sheet in the filter element was 645 sq.cm.

The unit was tested in a cardiopulmonary bypass circuit in which one head of a double-headed roller pump recirculated blood through approximately 300 cm. of three-eighths inch plastic tubing, and a cardiotomy suction reservoir elevated 78 cm. above the pump. Blood pressure was monitored before and after the filter. The second pump head was used to propel blood around a circuit which was similar except that it did not contain a filter. Each circuit was primed with 750 cc. of banked human blood. The perfusions were continued for 4 hours, at a flow rate of 4 liters per minute. Samples of blood were taken periodically for hematocrit, plasma hemoglobin, plasma electrophoresis, plasma lipoprotein electrophoresis, cholesterol, and platelets. The pressure drop across the filter was measured during the course of the perfusion, and also at the end of the perfusion, at which time the rate of flow was varied from 0 to 6 liters per minute. In three trials, the increase of plasma hemoglobin in the perfusate over four hours at a flow rate of 4 liters per minute was approximately the same, whether or not the filter was employed, showing that the filter had little adverse effect. The platelet concentration at the end of the experiments was reduced 42 to 66 percent in the circuit with the filter and 46 to 60 percent in the one without, again showing that the filter had little adverse effect.

During the course of the 4 hours of perfusion at 4 liters per minute, the pressure drop across the filter ranged between 8 and 40 mm. of mercury in five separate trials. Total plasma protein decreased by a mean of 10 percent in the circuit without the filter, and 11 percent in the circuit with the filter. The protein fractions decreased 4 to 19 percent, in an inconsistent pattern. Plasma cholesterol decreased by a mean of 5 percent, in an inconsistent pattern. Plasma cholesterol decreased by a mean of 5 percent, if the filter was excluded, and by 13 percent when the filter was present.

The filter has been used during cardiopulmonary bypass in a series of tests on a small group of patients undergoing cardiac open heart surgery and has performed satisfactory. None of the patients has shown any evidence of cerebral damage.

Having regard to the foregoing disclosures, the following is claimed as the inventive and patentable embodiments thereof:

1. In a disposable filter element capable of passing human blood substantially without removal of normal and desirable blood components at a high flow rate and useful in human blood circulation systems to remove microemboli, having a filter sheet and means for directing blood to pass through the sheet interposed in the line of blood flow, the improvement which comprises as the filter a woven square weave plastic mesh of polyester monofilaments said monofilaments having a diameter within the range from about 25 to about 50 microns, said mesh having a pore size within the range of about 25 to about 50 microns, the filaments being locked in place at their crossing points.

2. A disposable filter element in accordance with claim 1, in which the monofilaments have a diameter within the range from about 25 to about 50 microns.

3. A disposable filter element in accordance with claim 1, in which the polyester monofilaments are a polyester of ethylene glycol and terephthalic acid.

4. A disposable filter element in accordance with claim 1, in which the polyester monofilament mesh is composed of polyester monofilaments 40 microns in diameter with a mesh opening of 53 microns and 33 percent open area.

5. A disposable filter element in accordance with claim 1, in which the polyester monofilament mesh is composed of polyester monofilaments 40 microns in diameter with a mesh opening of 44 microns and 27 percent open area.

6. A disposable filter element in accordance with claim 1, in which the polyester monofilament mesh is composed of polyester monofilaments 40 microns in diameter with a mesh opening of 37 microns and 23 percent open area.

7. A disposable filter element in accordance with claim 1, in which the filaments are heat set to lock them in place.

8. A disposable filter unit comprising a filter element according to claim 1 and a housing having an inlet and an outlet and line connections thereat for fluid flow into and out from the housing, the filter element being disposed in the housing across the line of flow therebetween so that fluid flow therebetween must pass through the filter element.

9. A disposable filter unit in accordance with claim 8, in which the filter element is cylindrical and one line connection has a direct fluid flow connection to the interior of the filter cylinder.

10. A disposable filter unit in accordance with claim 8, in which the housing has an air vent closed off by a removable cap.

11. A disposable filter unit in accordance with claim 10, in which the cap closes off the vent in a tapered seal, the vent having a tapered bore, and the cap a tapered member projecting into and seating in the bore.

12. A disposable filter unit in accordance with claim 8, having a housing made in two portions bonded together.

13. A disposable filter unit in accordance with claim 12, made of plastic, with the portions fused together into one piece.

14. A disposable filter unit in accordance with claim 13, including line connections integral with the housing.

15. A disposable filter unit in accordance with claim 13, having the filter unit bonded to one housing portion.

16. A disposable filter unit in accordance with claim 15, having the filter unit bonded to one housing portion at the outlet with a direct fluid flow line connection from the filtrate-flow side of the filter element to the outlet.

17. A disposable filter unit in accordance with claim 8, having an air vent closed off by a removable cap, and a barrier at the inlet and attached to the housing in a position to shield the air vent from inlet flow.

18. A disposable filter unit in accordance with claim 17 in which the barrier and air vent are integral with the housing.

* * * * *

UNITED STATES PATENT OFFICE
CERTIFICATE OF CORRECTION

Patent No. 3,701,433    Dated October 31, 1972

Inventor(s) Sidney Krakauer et al.

It is certified that error appears in the above-identified patent and that said Letters Patent are hereby corrected as shown below:

Column 6, lines 30 to 32, delete "in an inconsistent pattern. Plasma cholesterol decreased by a mean of 5 percent,"

Column 6, line 55, Claim 1, "of" should be -- from --.

Signed and sealed this 19th day of March 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,701,433      Dated October 31, 1972

Inventor(s) Sidney Krakauer et al.

It is certified that error appears in the above-identified patent and that said Letters Patent are hereby corrected as shown below:

Column 2, line 67, "regidity" should read -- rigidity --; line 68, "estremely" should read -- extremely --. Column 3, lines 57 and 58, "FIG. 3 represents a longitudinal section through a filter unit embodying a filter element of FIG. 2." should read -- FIG. 3 represents a cross-sectional view taken along the lines 3-3 of FIG. 2, and looking in the direction of the arrows; --; lines 59 to 61, "FIG. 4 represents a cross-sectional view taken along the lines 4-4 of FIG. 3, and looking in the direction of the arrows;" should read -- FIG. 4 represents a longitudinal section through a filter unit embodying a filter element of FIG. 2; --. Column 6, lines 30 to 32, cancel "in an inconsistent pattern. Plasma cholesterol decresed by a mean of 5 percent,"; line 55, "of" should read -- from --.

This certificate supersedes Certificate of Correction issued March 19, 1974.

Signed and sealed this 8th day of October 1974.

(SEAL)
Attest:

McCOY M. GIBSON JR.
Attesting Officer

C. MARSHALL DANN
Commissioner of Patents